(12) United States Patent
Reichbach et al.

(10) Patent No.: US 11,314,447 B2
(45) Date of Patent: Apr. 26, 2022

(54) SYSTEM AND METHOD FOR SUSTAINING SINGLE NVME SUBSYSTEM BY A FEDERATED STORAGE ARRAY FOR NVME-OF CONNECTIVITY

(71) Applicant: EMC IP Holding Company, LLC, Hopkinton, MA (US)

(72) Inventors: Chen Reichbach, Tel Aviv (IL); Marina Shem Tov, Hod Hasharon (IL); Eldad Zinger, Raanana (IL); Dmitry Tylik, Westborough, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/934,181

(22) Filed: Jul. 21, 2020

(65) Prior Publication Data
US 2022/0027076 A1 Jan. 27, 2022

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 2018/0270119 A1* | 9/2018 | Ballapuram | ........ H04L 61/2015 |
| 2019/0361611 A1* | 11/2019 | Hosogi | ................. G06F 3/0631 |
| 2021/0072927 A1* | 3/2021 | Yang | ..................... G06F 3/0659 |

* cited by examiner

*Primary Examiner* — Jane Wei
(74) *Attorney, Agent, or Firm* — Brian J. Colandreo; Mark H. Whittenberger; Holland & Knight LLP

(57) ABSTRACT

A method, computer program product, and computer system for maintaining a federation of a plurality of appliances as a single subsystem, wherein maintaining the federation as the single subsystem may include maintaining a centralized discovery mechanism across the plurality of appliances, wherein a discovery service of the centralized discovery mechanism may return a list of all ports in the federation. Controller IDs for a predefined range of controller IDs may be allocated for a plurality of dynamic controllers per appliance of the plurality of appliances, wherein the controller IDs may be allocated as a response to a connect command from a host. An empty namespace list for the plurality of dynamic controllers on the plurality of appliances in the federation may be exposed. The host may receive a notification from at least one dynamic controller of the plurality of dynamic controllers on at least one appliance of the plurality of appliances in the federation. The host may obtain a list of namespaces hosted on the at least one appliance corresponding to the at least one dynamic controller.

17 Claims, 7 Drawing Sheets

SYSTEM AND METHOD FOR SUSTAINING SINGLE NVME SUBSYSTEM BY A FEDERATED STORAGE ARRAY FOR NVME-OF CONNECTIVITY

BACKGROUND

Some storage systems may involve a scale out federation of highly-available two node appliances that support host connectivity via, e.g., iSCSI, Fibre Channel and/or non-volatile memory express over fabrics (NVMe-oF). In some federations, (composed of multiple appliances), each appliance may have its own captive storage (e.g., volumes), where each appliance owns the volumes it consists of and those cannot be accessed from any other Appliance. Such storage systems, as a federation array, may support non-disruptive volume migration between appliances.

BRIEF SUMMARY OF DISCLOSURE

In one example implementation, a method, performed by one or more computing devices, may include but is not limited to maintaining a federation of a plurality of appliances as a single subsystem, wherein maintaining the federation as the single subsystem may include maintaining a centralized discovery mechanism across the plurality of appliances, wherein a discovery service of the centralized discovery mechanism may return a list of all ports in the federation. Controller IDs for a predefined range of controller IDs may be allocated for a plurality of dynamic controllers per appliance of the plurality of appliances, wherein the controller IDs may be allocated as a response to a connect command from a host. An empty namespace list for the plurality of dynamic controllers on the plurality of appliances in the federation may be exposed. The host may receive a notification from at least one dynamic controller of the plurality of dynamic controllers on at least one appliance of the plurality of appliances in the federation. The host may obtain a list of namespaces hosted on the at least one appliance corresponding to the at least one dynamic controller.

One or more of the following example features may be included. Obtaining the namespaces may include obtaining a list of namespaces specific to the at least one application based upon a current configuration of the at least one controller. Each dynamic controller may respond to the host with a respective list of namespaces according to a location of each dynamic controller. The respective list of namespaces may be independent of an earlier respective list of namespaces with which the plurality of dynamic controllers were initialized. The controller IDs may be dynamically allocated in bulk to the at least one appliance. A namespace ID may be allocated to a volume upon creation of the volume, wherein the namespace ID may be allocated to the volume regardless of an association of the volume to the host, and wherein the namespace ID and a globally unique ID are unique within the federation. The host may determine a configuration of the at least one controller by issuing an identify command that specifies a data structure of the at least one controller.

In another example implementation, a computing system may include one or more processors and one or more memories configured to perform operations that may include but are not limited to maintaining a federation of a plurality of appliances as a single subsystem, wherein maintaining the federation as the single subsystem may include maintaining a centralized discovery mechanism across the plurality of appliances, wherein a discovery service of the centralized discovery mechanism may return a list of all ports in the federation. Controller IDs for a predefined range of controller IDs may be allocated for a plurality of dynamic controllers per appliance of the plurality of appliances, wherein the controller IDs may be allocated as a response to a connect command from a host. An empty namespace list for the plurality of dynamic controllers on the plurality of appliances in the federation may be exposed. The host may receive a notification from at least one dynamic controller of the plurality of dynamic controllers on at least one appliance of the plurality of appliances in the federation. The host may obtain a list of namespaces hosted on the at least one appliance corresponding to the at least one dynamic controller.

One or more of the following example features may be included. Obtaining the namespaces may include obtaining a list of namespaces specific to the at least one application based upon a current configuration of the at least one controller. Each dynamic controller may respond to the host with a respective list of namespaces according to a location of each dynamic controller. The respective list of namespaces may be independent of an earlier respective list of namespaces with which the plurality of dynamic controllers were initialized. The controller IDs may be dynamically allocated in bulk to the at least one appliance. A namespace ID may be allocated to a volume upon creation of the volume, wherein the namespace ID may be allocated to the volume regardless of an association of the volume to the host, and wherein the namespace ID and a globally unique ID are unique within the federation. The host may determine a configuration of the at least one controller by issuing an identify command that specifies a data structure of the at least one controller.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
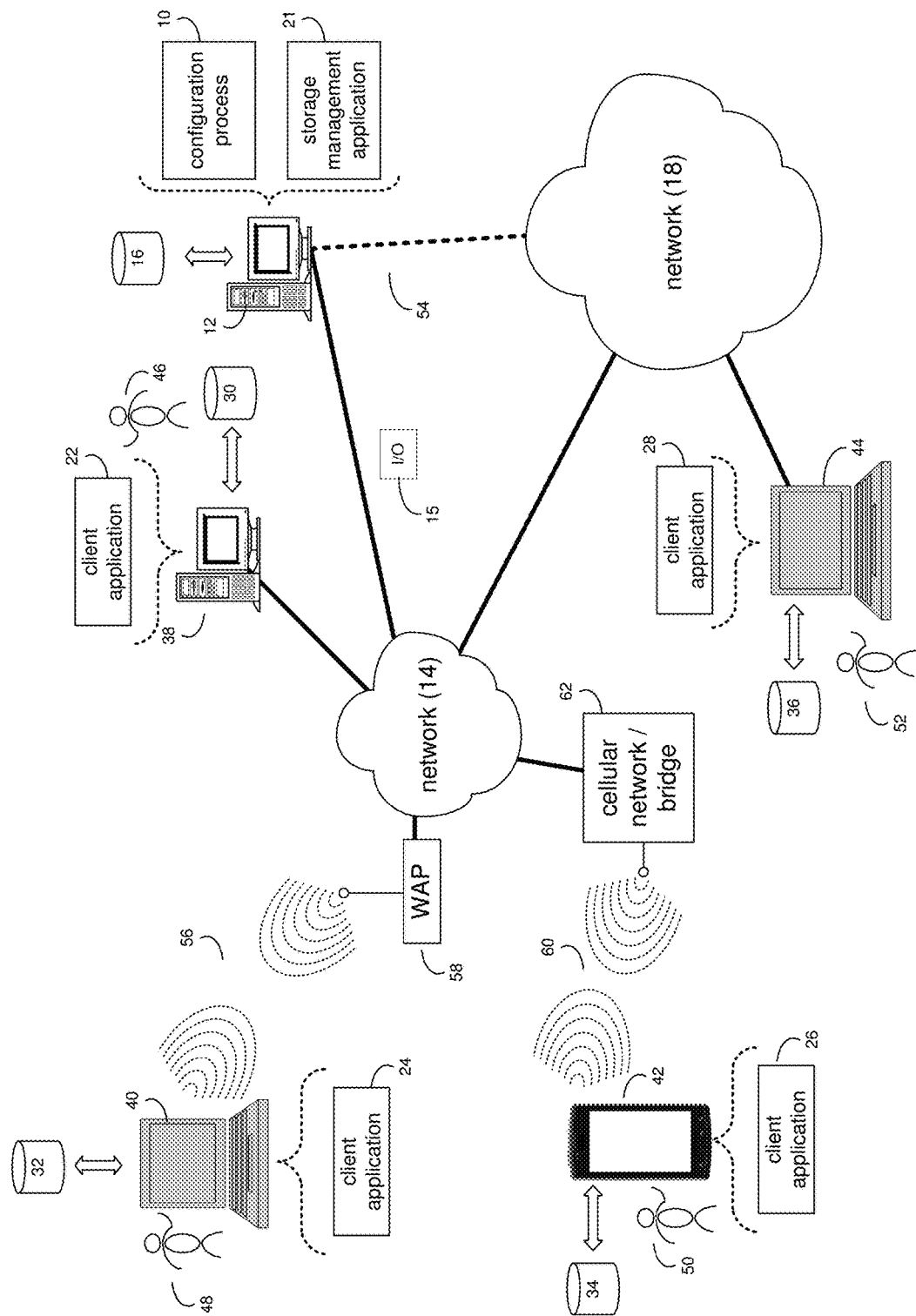
FIG. 1 is an example diagrammatic view of a configuration process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown configuration process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a configuration process, such as configuration process 10 of FIG. 1, may maintain a federation of a plurality of appliances as a single subsystem, wherein maintaining the federation as the single subsystem may include maintaining a centralized discovery mechanism across the plurality of appliances, wherein a discovery service of the centralized discovery mechanism may return a list of all ports in the federation. Controller IDs for a predefined range of controller IDs may be allocated for a plurality of dynamic controllers per appliance of the plurality of appliances, wherein the controller IDs may be allocated as a response to a connect command from a host. An empty namespace list for the plurality of dynamic controllers on the plurality of appliances in the federation may be exposed. The host may receive a notification from at least one dynamic controller of the plurality of dynamic controllers on at least one appliance of the plurality of appliances in the federation. The host may obtain a list of namespaces hosted on the at least one appliance corresponding to the at least one dynamic controller.

In some implementations, the instruction sets and subroutines of configuration process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, configuration process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, configuration process 10 and/or storage management application 21 may be accessed via one or more of client applications 22, 24, 26, 28. In some implementations, configuration process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within configuration process 10, a component of configuration process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of configuration process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of configuration process 10 (and vice versa). Accordingly, in some implementations, configuration process 10 may be a purely server-side application, a purely client-side application, or a hybrid server-side/client-side application that is cooperatively executed by one or more of client applications 22, 24, 26, 28 and/or configuration process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, configuration process 10, and storage management application 21, taken singly or in any combination, may effectuate some or all of the same functionality, any description of effectuating such functionality via one or more of client applications 22, 24, 26, 28, configuration process 10, storage management application 21, or combination thereof, and any described interaction(s) between one or more of client applications 22, 24, 26, 28, configuration process 10, storage management application 21, or combination thereof to effectuate such functionality, should be taken as an example only and not to limit the scope of the disclosure.

In some implementations, one or more of users 46, 48, 50, 52 may access computer 12 and configuration process 10 (e.g., using one or more of client electronic devices 38, 40, 42, 44) directly through network 14 or through secondary network 18. Further, computer 12 may be connected to network 14 through secondary network 18, as illustrated with phantom link line 54. Configuration process 10 may include one or more user interfaces, such as browsers and textual or graphical user interfaces, through which users 46, 48, 50, 52 may access configuration process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
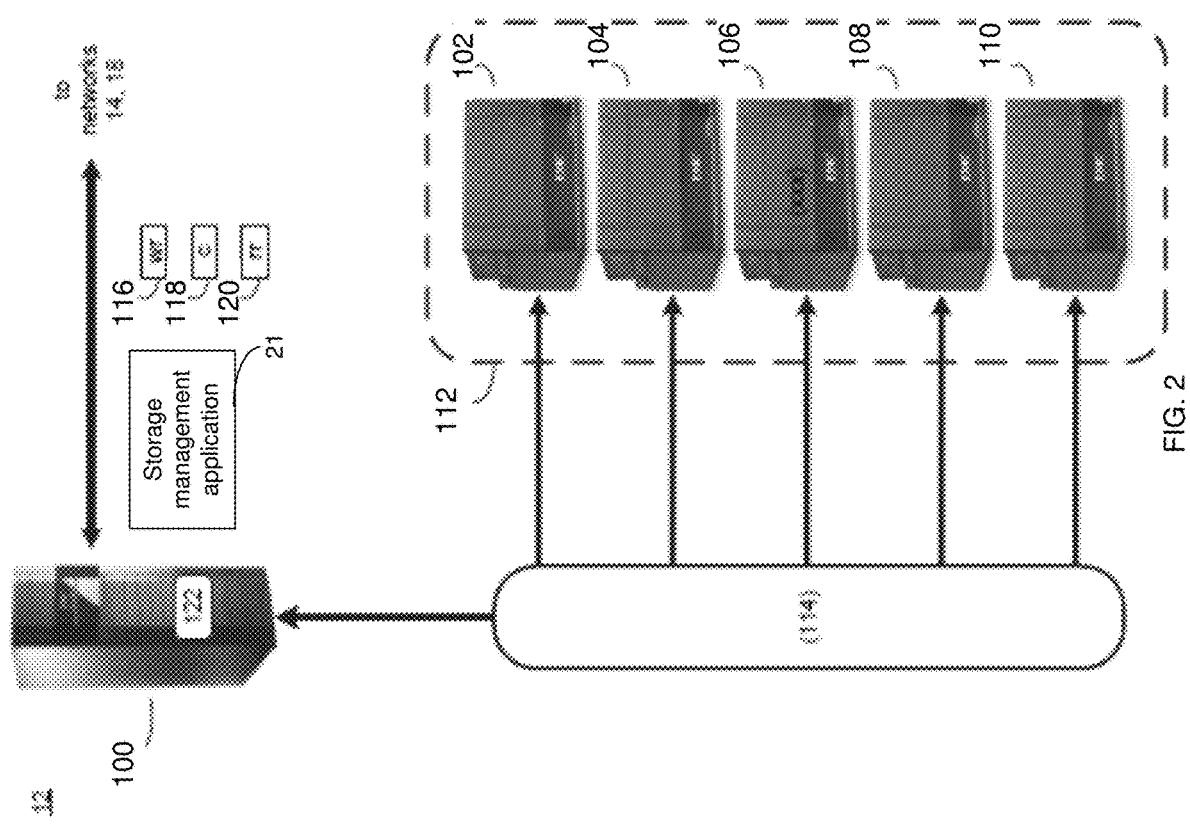
FIG. 2 is an example diagrammatic view of a storage system of FIG. 1 according to one or more example implementations of the disclosure.
Figure 3:
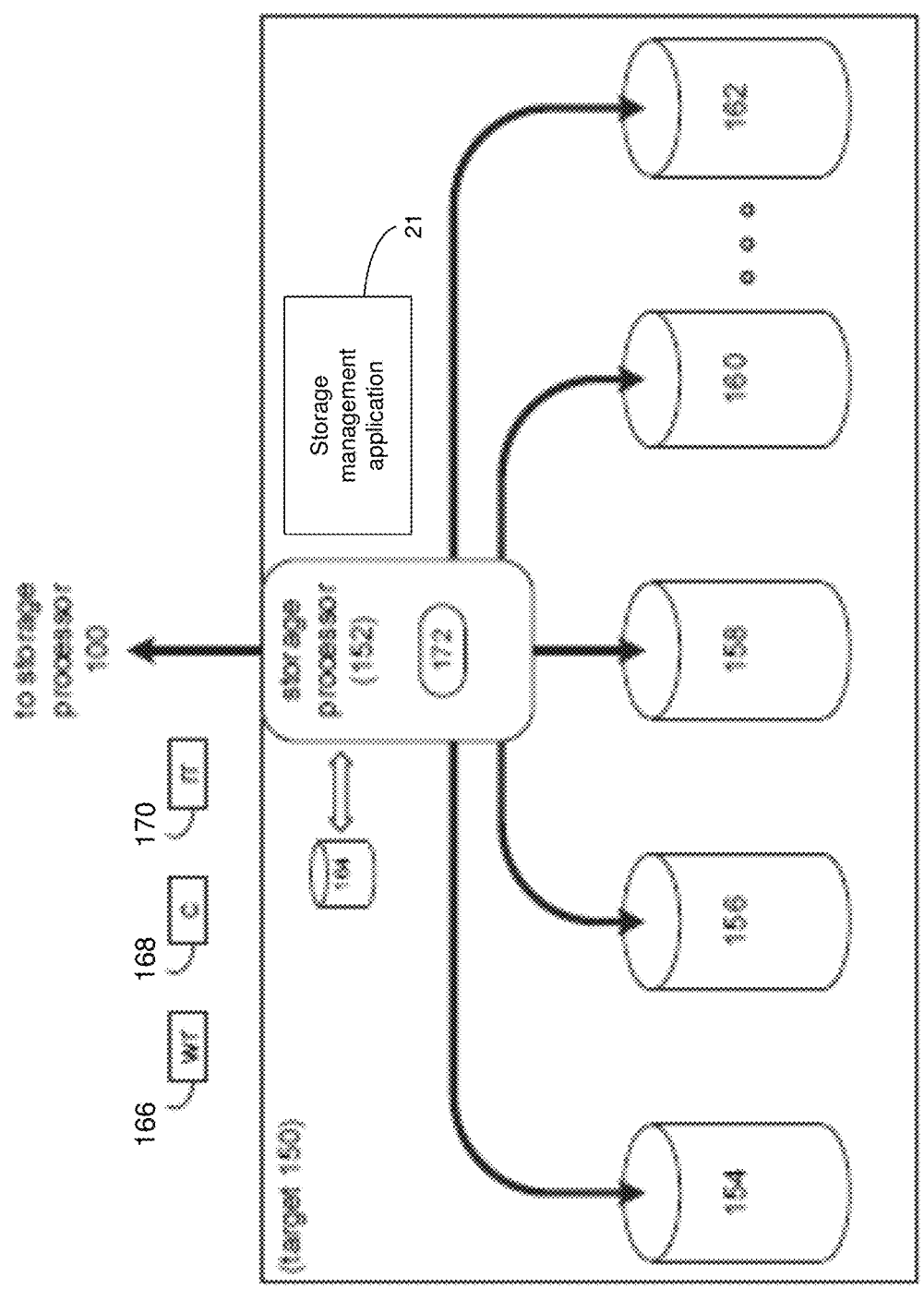
FIG. 3 is an example diagrammatic view of a storage target of FIG. 1 according to one or more example implementations of the disclosure.
Figure 4:
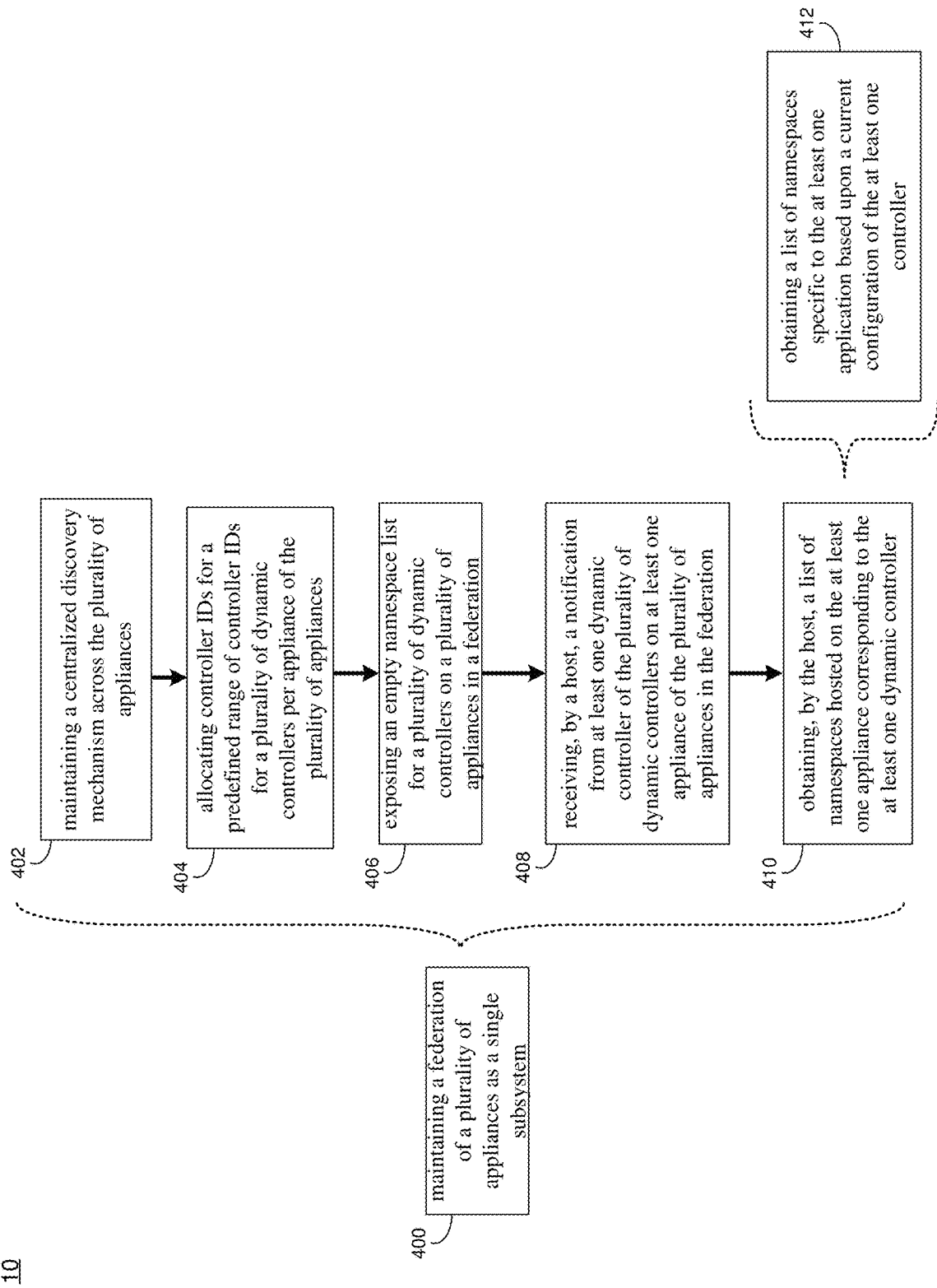
FIG. 4 is an example flowchart of a configuration process according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or configuration process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, some storage systems may involve a scale out federation of highly-available two node appliances that support host connectivity via, e.g., iSCSI, Fibre Channel and/or non-volatile memory express over fabrics (NVMe-oF). In some federations, (composed of multiple appliances), each appliance may have its own captive storage (e.g., volumes), where each appliance owns the volumes it consists of and those cannot be accessed from any other Appliance. Such storage systems, as a federation array, may support non-disruptive volume migration between appliances. Introducing NVMe-oF front-end host connectivity may raise the need to define the scope of the NVMe Subsystem.

NVMe specifications may define the scope of a namespace to be unique within a NVM subsystem, which leads to define a federation as a single subsystem, thus allowing namespace sharing across appliances to be able to support volume migration between appliances; however, the NVMe specification is not known to currently support sharing of namespaces across multiple NVM subsystems. Also, from the management perspective, as storage systems may be managed as a single storage array, it may be more logical to define it as a single subsystem towards the hosts.

Generally, the basic definitions and constraints of a federation architecture may be as follows:

Basic definitions of storage systems architecture as a federation:

An Appliance—the building block which consists of two connected nodes/computing servers with shared backend drives, running the storage stack that communicates over the network.

A Cluster/Federation—Appliances (one or more) may be clustered into a federation, connected by a network and managed as a single cluster under a shared management interface via a management application.

Architecture composed of, e.g., 2 layers of management application to achieve better performance:

Appliance management level—referred as SYM (System Manager), manages objects and tasks at the scope of a single appliance. This layer manages components on both Nodes within an appliance. This layer has northbound API with second management level to receive configuration and update statuses, and southbound API with node's components, e.g., with FE (Front End drivers).

Federation\Cluster management level—referred as CP (Control Path), it supports: The external interfaces, such as REST API and CLI, configuration, management, and diagnosing of objects and tasks across appliances which should be managed at cluster\federation scope. It interacts with appliance management level.

An asymmetric federated array is a federation composed of multiple appliances and each has its own captive volumes, which cannot be accessed from other appliances in the federation. Some storage systems as an asymmetric federated array may support Non-Disruptive Volume Migration between appliances to provide load balancing of allocated storage between appliances. Volume migration between appliances lead to the fact that the same volume with the same identification data needs to be exposed at the destination appliance to which it is migrated. This leads to each volume potentially being shared between all appliances within the federation.

For iSCSI connectivity, some storage systems may report all iSCSI targets across the federation from any logged-in target.

An NVM subsystem may include one or more controllers, zero or more namespaces, and one or more ports. An NVM subsystem may include a non-volatile memory storage medium and an interface between the controller(s) in the NVM subsystem and non-volatile memory storage medium.

The above-noted controller may involve NVMe command processing that has access to namespaces. It may provide an access path between a host and the namespaces in the storage array. Admin and I/O QPs may be created at the controller during the connect command from a specific Host.

The namespace may involve a quantity of non-volatile memory that may be formatted into logical blocks. When formatted, a namespace of size n is a collection of logical blocks with logical block addresses from 0 to (n−1). Namespace is a volume at intelligent arrays (equivalent to logical unit (LU) in SCSI).

The namespace ID (NSID) may involve an identifier used by a controller to provide access to a namespace. The namespace ID shall be the same in all controllers that have access to a shared namespace, e.g., it shall be unique within a NVMe subsystem (e.g., 32-bit long identifier).

NVMe over fabrics may define a discovery mechanism that a host uses to determine the NVM subsystem(s) that expose namespaces that the host may access. One of the capabilities the discovery service provides to a host is the ability to discover multiple paths to an NVM subsystem, e.g., reports all subsystem ports through which the host can connect to a subsystem. This mechanism is analogous to iSCSI report targets, and in order to align NVMe-oF implementation with SCSI host connectivity behavior, storage systems may maintain a discovery service that reports all NVMe subsystem ports across the federation.

In a dynamic controller model, the controller may be allocated by the NVM subsystem on demand. The controller ID may be unique within a subsystem, which means unique at the entire cluster\federation.

Namespace ID (NSID) may involve an identifier used by a controller to provide access to a namespace. A NSID representing a specific volume must be identical through all controllers within a NVMe subsystem that has access to a shared namespace. Currently, as for NVMe Spec 1.4, namespace sharing is not defined across multiple subsystems.

NVMe multipath may perform its grouping (grouping multiple paths to a specific volume) based on subsystem NQN and NSID. This requires defining a storage system federation as a single subsystem to provide namespace sharing across appliances. A single subsystem is a prerequisite for volume migration between appliances, allowing host multi-pathing software to group multiple paths into a single device.

According to current NVMe specs, when using a dynamic controller model all controllers allocated to a specific host have the same state at the time the association is established, including attached namespaces and feature settings. This requirement may be interpreted that all NVMe controllers attached to a host within the NVM subsystem must report an identical active namespace list irrespective of the physical location of that port/controller. For a clustered distributed storage array, a single subsystem may be applied on entire storage Array/Cluster. However, introducing a single subsystem for a federated array according to the present disclosure may be unique, as the typical approach is that the subsystem scope is the storage scope (i.e., appliance), but as some storage systems may support volume migration, namespace sharing is needed across the entire federation, along with the fact that currently there is no namespace sharing between subsystems, leading to the need to find a solution to maintain a single subsystem for the federation.

As such, as will be discussed below, the present disclosure may introduce the concept of extending NVM subsystem various components and objects across the federation although being managed at the scope of an appliance in order to sustain a federated array as a single subsystem.

The Configuration Process:

As discussed above and referring also at least to the example implementations of FIGS. 4-7, configuration process 10 may maintain 400 a federation of a plurality of appliances as a single subsystem, wherein maintaining the federation as the single subsystem may include maintaining 402 a centralized discovery mechanism across the plurality of appliances, wherein a discovery service of the centralized discovery mechanism may return a list of all ports in the federation. Configuration process 10 may allocate 404 controller IDs for a predefined range of controller IDs for a plurality of dynamic controllers per appliance of the plurality of appliances, wherein the controller IDs may be allocated as a response to a connect command from a host. Configuration process 10 may expose 406 an empty namespace list for the plurality of dynamic controllers on the plurality of appliances in the federation. Configuration process 10 may receive 408, by the host, a notification from at least one dynamic controller of the plurality of dynamic controllers on at least one appliance of the plurality of appliances in the federation. Configuration process 10 may obtain 410, at the host, a list of namespaces hosted on the at least one appliance corresponding to the at least one dynamic controller.

For example, the following is a list of example and non-limiting problems and example and non-limiting solutions for configuration process 10 to maintain 400 a federation of a plurality of appliances as a single subsystem, wherein maintaining the federation as the single subsystem may include maintaining 402 a centralized discovery mechanism across the plurality of appliances, wherein a discovery service of the centralized discovery mechanism may return a list of all ports in the federation.

For example, to be aligned with SCSI behavior, a federation shall maintain discovery service that may be accessed from any NVMe enabled front-end port and returned at a discovery log page list of all NVME-oF ports from all appliances. In order to maintain centralized discovery mechanism, a distribution mechanism of configuration process 10 may be required at the level of cluster/federation management (e.g., second management level), which may extend all front-end ports/paths available for NVMe-oF host connectivity across all appliances. At the storage system storage frond-end (FE) ports (e.g., SCSI targets or NVMe subsystem ports) may be added as a result of, e.g., "appliance addition" where the fibre channel (FC) FE ports are added upon adding an appliance that includes FC ports, where the FC port may function by default as a SCSI target and as NVMe/FC subsystem port simultaneously; "Port scaling" where NVMe/TCP or NVMe/RoCE may run over FE Ethernet (Eth) ports added via User Configuration. Upon "appliance addition" or upon "port scaling" into a storage network (e.g., addition of FE Port to be used as NVMe "Target"/subsystem port) from any appliance, the CP layer (e.g., via configuration process 10) may distribute this configuration to all appliances' management layer, e.g., SYM at each appliance is updated with configuration of the NVMe subsystem ports across the federation. The SYM layer (e.g., via configuration process 10) may update the FE NVMe driver on each node at the appliance with the list of the ports from all appliances in the federation.

The discovery service (e.g., via configuration process 10) is a discovery subsystem with a discovery controller, which support returning a discovery log page upon a "Get log page" or similar command issued by a Host (e.g., via configuration process 10). The discovery service may be accessed from any FE port that is added as the NVMe subsystem port and returns the list of all NVMe subsystem ports at the entire federation, meaning from entire subsystem.

In some implementations, configuration process 10 may allocate 404 controller IDs for a predefined range of controller IDs for a plurality of dynamic controllers per appliance of the plurality of appliances, wherein the controller IDs may be allocated as a response to a connect command from a host. For example, the controller ID allocation, is where the controller ID may be allocated as a response to a "connect command" or similar from a Host. The controller represents a path/association from the host to the subsystem Port ("target") (equivalent to I-T *nexus* in SCSI). As the front-end stack does not have the awareness of the federation, in order to be able to response to the connect command without accessing the CP (Cluster management level) for the controller ID allocation, configuration process 10 may have a pre-allocation of controller IDs per appliance per node.

In some implementations, configuration process 10 may include hard partitioning ranges between appliances, where configuration process 10 may allocate a predefined range of controller IDs per appliance. Configuration process 10 may divide the full Range of controller IDs, e.g., [1-0xFFF0] ([1-65,520]) evenly between appliances. Using NVMe-oF as an example, there may be, e.g., 4000 controller IDs allocated per node (8000 per appliance), which fits up to 8 appliances. SYM (appliance management level) (e.g., via configuration process 10) may have awareness of the appliance ID, and it may allocate the relevant range of IDs to the FE driver at each node as part of the initialization flow (discussed further below). The example advantage of this solution is, CP is not involved and not aware of the controller IDs, but the example disadvantage is, it is hard limited to 4000 controllers per node and even if the federation will consist of less appliances, it is impossible to allocate more than 4000 IDs per node. In some implementations, controller IDs may be dynamically allocated in bulk to the at least one appliance. For example, if the need is raised, another method of dynamically allocating bulks of the controller IDs to an appliance may be considered, but this may require awareness of controller IDs at the CP layer, and it may solve the limitation of hard partitioning.

In some implementations, a namespace ID may be allocated to a volume upon creation of the volume, wherein the namespace ID may be allocated to the volume regardless of an association of the volume to the host, and wherein the namespace ID and a globally unique ID are unique within the federation. For example, in some implementations, the above-noted namespace ID (NSID) should be unique in a subsystem, i.e., in the federation, where the NSID is allocated uniquely at namespace\volume creation time. The NSID is allocated (e.g., via configuration process 10) to a volume regardless the association of the volume to a host. Upon volume creation, the CP (e.g., via configuration process 10) allocates unique IDs. As it is not known at the stage of volume creation to which type of host, SCSI or NVMe, the volume will be attached, CP (e.g., via configuration process 10) may allocate all unique identifiers for both protocols (e.g., for SCSI access, wwn (NAA-6), and for NVMe access both NGUID (NVMe Globally Unique ID) and NSID, which should be unique within a subsystem, i.e., in the federation.

In some implementations, configuration process 10 may provide a method for sharing namespaces through all appliances in the federation, that may be interpreted that all NVMe controllers attached to a host within a single NVM subsystem should expose the same namespace list from all controllers. As such, in some implementations, configuration process 10 may duplicate all volumes to comply with any specifications for host behavior, if the same namespace list will be required to be exposed from all controllers. The controller on the appliances not hosting the actual volume may report (e.g., via configuration process 10) ANA state 'Inaccessible'. This solution has a very large scale, memory and possible performance impact on the system. Some of the issues may be mitigated by not duplicating a full volume, rather only the minimal information needed for compliance, by creating a "slim volume" instead of a full one.

As will be discussed below, the present disclosure proposes that each controller will expose only the namespaces hosted on the appliance at which the controller is located on. This may satisfy the requirement that all controllers allocated to a specific host have the same state at the time the association is established, including attached namespaces and Feature settings. That is, as long as the initial state that is exposed by all dynamic controllers is the same, a future state may differ. Unique steps of initialization of the controller will now be discussed.

For instance, in some implementations, configuration process 10 may expose 404 an empty namespace list for the plurality of dynamic controllers on the plurality of appliances in the federation, where in some implementations, the empty namespace list for the plurality of dynamic controllers may be exposed after the at least one dynamic controller is enabled. For example, after the controller is enabled, configuration process 10 may expose 404 an empty namespace list for all dynamic controllers on all appliances, and thereby consistent with the NVMeoF specification that every dynamic controller has the same state at the time of association, including attached namespaces.

In some implementations, configuration process 10 may receive 408, at the host, a notification from at least one dynamic controller of the plurality of dynamic controllers on at least one appliance of the plurality of appliances in the federation, where in some implementations, the notification may include an asynchronous event request notification. For example, the controller (e.g., via configuration process 10) may respond with a namespace attachment (e.g., Namespace Attribute Change) Asynchronous notification, which may be received 408 by the host immediately following the Asynchronous Event Request (AER) sent from the host to the controller.

In some implementations, configuration process 10 may obtain 410, at the host, a list of namespaces hosted on the at least one appliance corresponding to the at least one dynamic controller, and in some implementations, obtaining 410 the namespaces may include obtaining 406 a list of namespaces specific to the at least one application based upon a current configuration of the at least one controller. For example, upon receiving the AER notification, this may cause host (e.g., via configuration process 10) to perform a rescan and obtain 410 the namespaces hosted on the corresponding appliance of the controller, and obtain 412 the appliance specific list of namespaces. In some implementations, each dynamic controller may respond to the host with a respective list of namespaces according to a location of each dynamic controller, and in some implementations, the respective list of namespaces may be independent of an earlier respective list of namespaces with which the plurality of dynamic controllers were initialized. For example, when the host (e.g., via configuration process 10) performs the rescan and obtains the namespaces hosted on the corresponding appliance, the host (e.g., via configuration process 10) may thus obtain 412 the appliance specific list of namespaces based on the controller's current configuration, independently of what the controller was initialized with. Moreover, each controller may (e.g., via configuration process 10) response with the namespace list according to its location.

Figure 5:
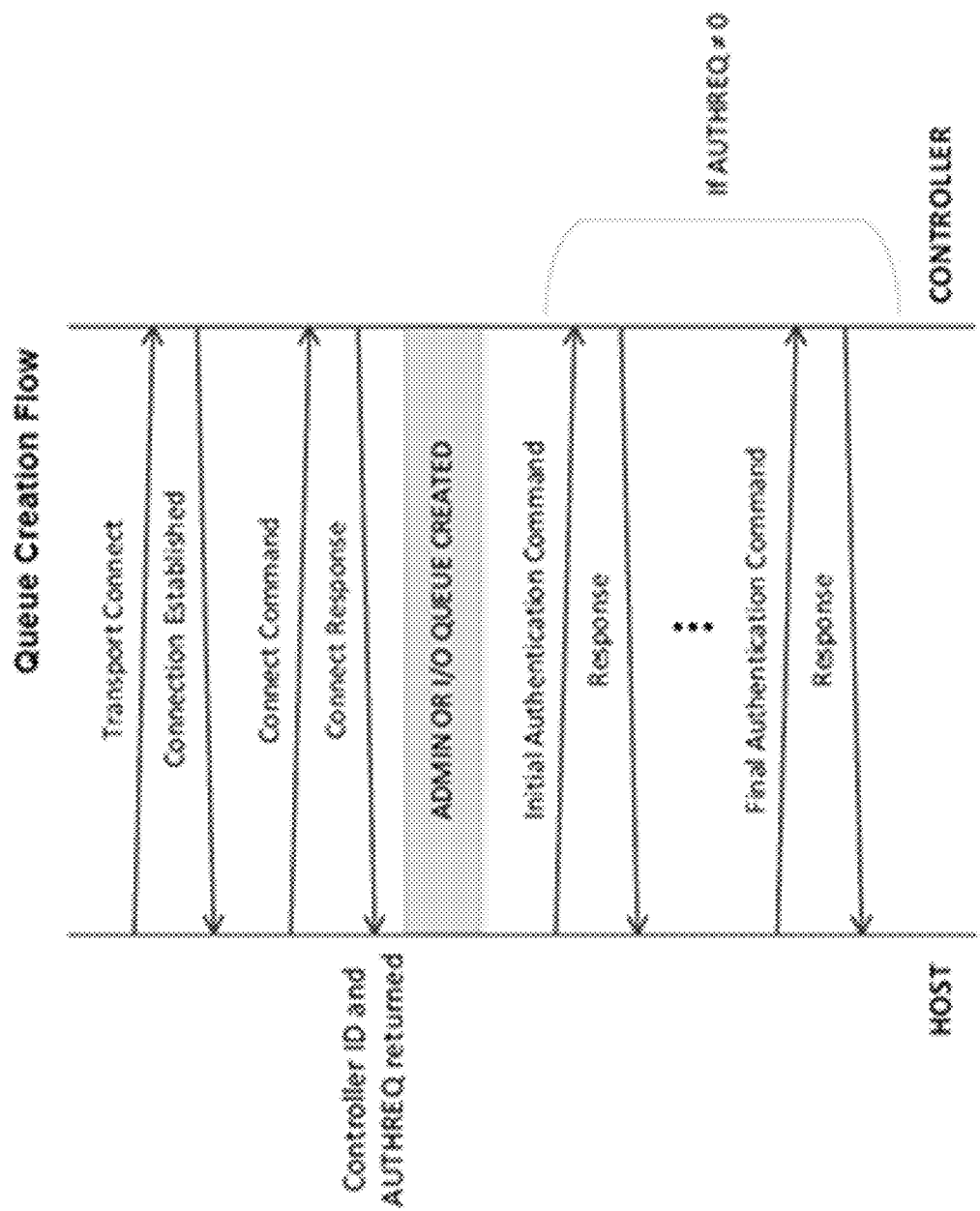
FIG. 5 is an example flowchart of a configuration process according to one or more example implementations of the disclosure.

An example controller architecture and queue creation flow of configuration process 10 is shown in the example implementation of FIG. 5. In the example, this flow may be similar to the "NVMe over Fabrics 1.1" specification in chapter 4. In some implementations, the controller initialization steps after an association is established and the controller ID is allocated are described below. For determining the capabilities or configuring properties, the host (e.g., via configuration process 10) may use the "Property Get" and "Property Set" or similar commands, respectively. Configuration process 10 may perform an NVMe in-band authentication if required. The host (e.g., via configuration process 10) may determine the controller capabilities. The host (e.g., via configuration process 10) may configure the controller settings. Specific settings may include, e.g., that the arbitration mechanism should be selected in CC.AMS; the memory page size should be initialized in CC.MPS; the I/O Command Set that is to be used should be selected in CC.CSS; and the controller should be enabled by setting CC.EN to '1';

In some implementations, the host should wait for the controller to indicate it is ready to process commands. The controller may be ready to process commands when CSTS.RDY is set to '1'.

In some implementations, the host may determine a configuration of the at least one controller by issuing an identify command that specifies a data structure of the at least one controller. For example, the host may determine the configuration of the controller by issuing the identify command, specifying the controller data structure. The host may then determine the configuration of each namespace by issuing the identify command (or similar) for each namespace, specifying the namespace data structure. As such, configuration process 10 may keep the namespace list empty at this point for all dynamic controllers and thereby consistent with NVMe-oF specifications that every dynamic controller has the same state at the time of association, including attached namespaces. The host (e.g., via configuration process 10) may then determine the number of I/O Submission Queues and I/O Completion Queues supported using the set features (or similar) command with the Number of Queues feature identifier. If the host desires asynchronous notification of optional events, the host (e.g., via configuration process 10) may issue a Set Features (or similar) command specifying the events to enable. If the host desires asynchronous notification of events, the host (e.g., via configuration process 10) may submit an appropriate number of Asynchronous Event Request (or similar) commands. This may be done at any point after the controller signals it is ready (e.g., where CSTS.RDY is set to '1'). At this point, the controller (e.g., via configuration process 10) may respond with a namespace attachment Asynchronous notification to the host immediately following AER from the host. This would cause the host to perform the rescan and obtain the namespaces hosted on the appliance at which the controller is located, as noted above.

Figure 6:
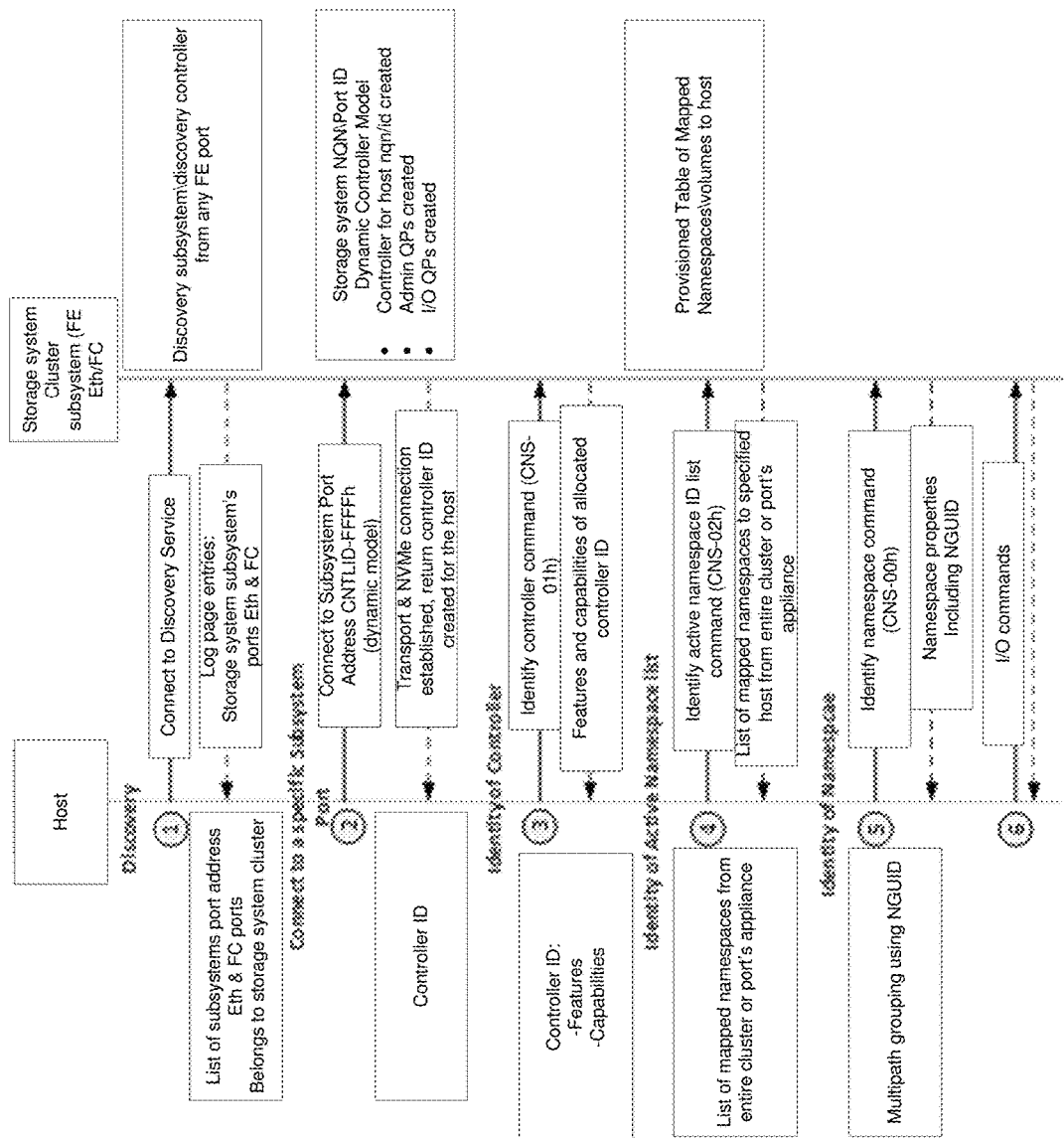
FIG. 6 is an example flowchart of a configuration process according to one or more example implementations of the disclosure.

An example connectivity flow of configuration process 10 is shown in the example implementation of FIG. 6. As can be seen in FIG. 6, the connectivity flow is between the host and the storage system cluster subsystem (frontend Ethernet/ fibre channel).

Figure 7:
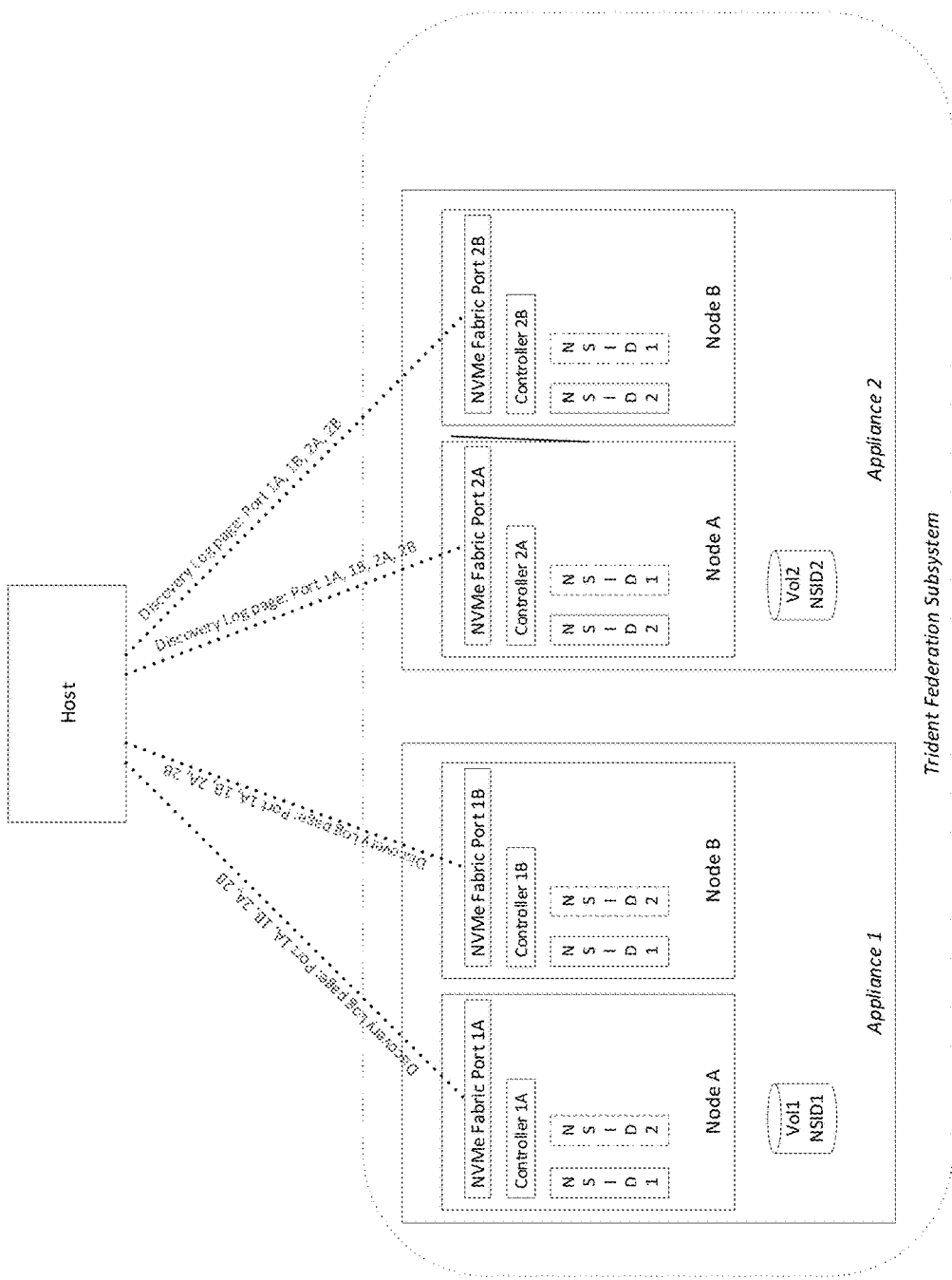
FIG. 7 is an example diagrammatic view of a storage system architecture according to one or more example implementations of the disclosure.

Referring also at least to the example implementation of FIG. 7, an example storage system NVMe subsystem architecture 700 is shown. In the example, access to the above-noted discovery mechanism from any port, returns the same discovery log page, where all available paths (NVMe subsystem ports) in the federation are returned with the storage system subsystem NQN. In some implementations, controllers 1A, 1B, 2A, 2B are unique across the federation. In the example, Vol1 is assigned as NSID1, Vol2 is assigned as NSID2, where NSID1, NSID2 are unique in the federation. Additionally, Vol1 (NSID1) and Vol2 (NSID2) are shown attached to the host, where Vol1 is located on Appliance 1 and Vol2 is located on Appliance 2. In some implementations, each controller may (e.g., via configuration process 10) report only the volumes hosted on the appliance it is located on, or in some implementations, an optional "Slim Volume" may be created, where all the controllers report all volumes attached to the host on the federation regardless of their location.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    maintaining a federation of a plurality of appliances as a single subsystem, wherein maintaining the federation as the single subsystem includes:
    maintaining a centralized discovery mechanism across the plurality of appliances, wherein a discovery service of the centralized discovery mechanism returns a list of all ports in the federation;
    allocating controller IDs for a predefined range of controller IDs for a plurality of dynamic controllers per appliance of the plurality of appliances, wherein the controller IDs are allocated as a response to a connect command from a host;
    exposing an empty namespace list for the plurality of dynamic controllers on the plurality of appliances in the federation;
    receiving, by the host, a notification from at least one dynamic controller of the plurality of dynamic controllers on at least one appliance of the plurality of appliances in the federation; and
    obtaining, by the host, a list of namespaces hosted on the at least one appliance corresponding to the at least one dynamic controller, wherein each dynamic controller responds to the host with a respective list of namespaces according to a location of each dynamic controller.

2. The computer-implemented method of claim 1 wherein obtaining the namespaces includes obtaining a list of namespaces specific to the at least one application based upon a current configuration of the at least one controller.

3. The computer-implemented method of claim 1 wherein the respective list of namespaces is independent of an earlier respective list of namespaces with which the plurality of dynamic controllers were initialized.

4. The computer-implemented method of claim 1 wherein the controller IDs are dynamically allocated in bulk to the at least one appliance.

5. The computer-implemented method of claim 1 wherein a namespace ID is allocated to a volume upon creation of the volume, wherein the namespace ID is allocated to the volume regardless of an association of the volume to the host, and wherein the namespace ID and a globally unique ID are unique within the federation.

6. The computer-implemented method of claim 1 wherein the host determines a configuration of the at least one controller by issuing an identify command that specifies a data structure of the at least one controller.

7. A computer program product residing on a non-transitory computer readable storage medium having a plurality of instructions stored thereon which, when executed across one or more processors, causes at least a portion of the one or more processors to perform operations comprising:
    maintaining a federation of a plurality of appliances as a single subsystem, wherein maintaining the federation as the single subsystem includes:
    maintaining a centralized discovery mechanism across the plurality of appliances, wherein a discovery service of the centralized discovery mechanism returns a list of all ports in the federation;
    allocating controller IDs for a predefined range of controller IDs for a plurality of dynamic controllers per appliance of the plurality of appliances, wherein the controller IDs are allocated as a response to a connect command from a host;

exposing an empty namespace list for the plurality of dynamic controllers on the plurality of appliances in the federation;

receiving, by the host, a notification from at least one dynamic controller of the plurality of dynamic controllers on at least one appliance of the plurality of appliances in the federation; and obtaining, by the host, a list of namespaces hosted on the at least one appliance corresponding to the at least one dynamic controller, wherein each dynamic controller responds to the host with a respective list of namespaces according to a location of each dynamic controller.

8. The computer program product of claim 7 wherein obtaining the namespaces includes obtaining a list of namespaces specific to the at least one application based upon a current configuration of the at least one controller.

9. The computer program product of claim 7 wherein the respective list of namespaces is independent of an earlier respective list of namespaces with which the plurality of dynamic controllers were initialized.

10. The computer program product of claim 7 wherein the controller IDs are dynamically allocated in bulk to the at least one appliance.

11. The computer program product of claim 7 wherein a namespace ID is allocated to a volume upon creation of the volume, wherein the namespace ID is allocated to the volume regardless of an association of the volume to the host, and wherein the namespace ID and a globally unique ID are unique within the federation.

12. The computer program product of claim 7 wherein the host determines a configuration of the at least one controller by issuing an identify command that specifies a data structure of the at least one controller.

13. A computing system including one or more processors and one or more memories configured to perform operations comprising:

maintaining a federation of a plurality of appliances as a single subsystem, wherein maintaining the federation as the single subsystem includes:

maintaining a centralized discovery mechanism across the plurality of appliances, wherein a discovery service of the centralized discovery mechanism returns a list of all ports in the federation;

allocating controller IDs for a predefined range of controller IDs for a plurality of dynamic controllers per appliance of the plurality of appliances, wherein the controller IDs are allocated as a response to a connect command from a host;

exposing an empty namespace list for the plurality of dynamic controllers on the plurality of appliances in the federation;

receiving, by the host, a notification from at least one dynamic controller of the plurality of dynamic controllers on at least one appliance of the plurality of appliances in the federation; and obtaining, by the host, a list of namespaces hosted on the at least one appliance corresponding to the at least one dynamic controller, wherein each dynamic controller responds to the host with a respective list of namespaces according to a location of each dynamic controller.

14. The computing system of claim 13 wherein obtaining the namespaces includes obtaining a list of namespaces specific to the at least one application based upon a current configuration of the at least one controller.

15. The computing system of claim 11 wherein the respective list of namespaces is independent of an earlier respective list of namespaces with which the plurality of dynamic controllers were initialized.

16. The computing system of claim 13 wherein the controller IDs are dynamically allocated in bulk to the at least one appliance.

17. The computing system of claim 13 wherein a namespace ID is allocated to a volume upon creation of the volume, wherein the namespace ID is allocated to the volume regardless of an association of the volume to the host, and wherein the namespace ID and a globally unique ID are unique within the federation.

* * * * *